Jan. 2, 1962     I. F. CLARK     3,015,516
INNER PANEL WITH COMBINED ARMREST AND HANDHOLD FOR VEHICLE DOORS
Filed March 30, 1959     3 Sheets-Sheet 1
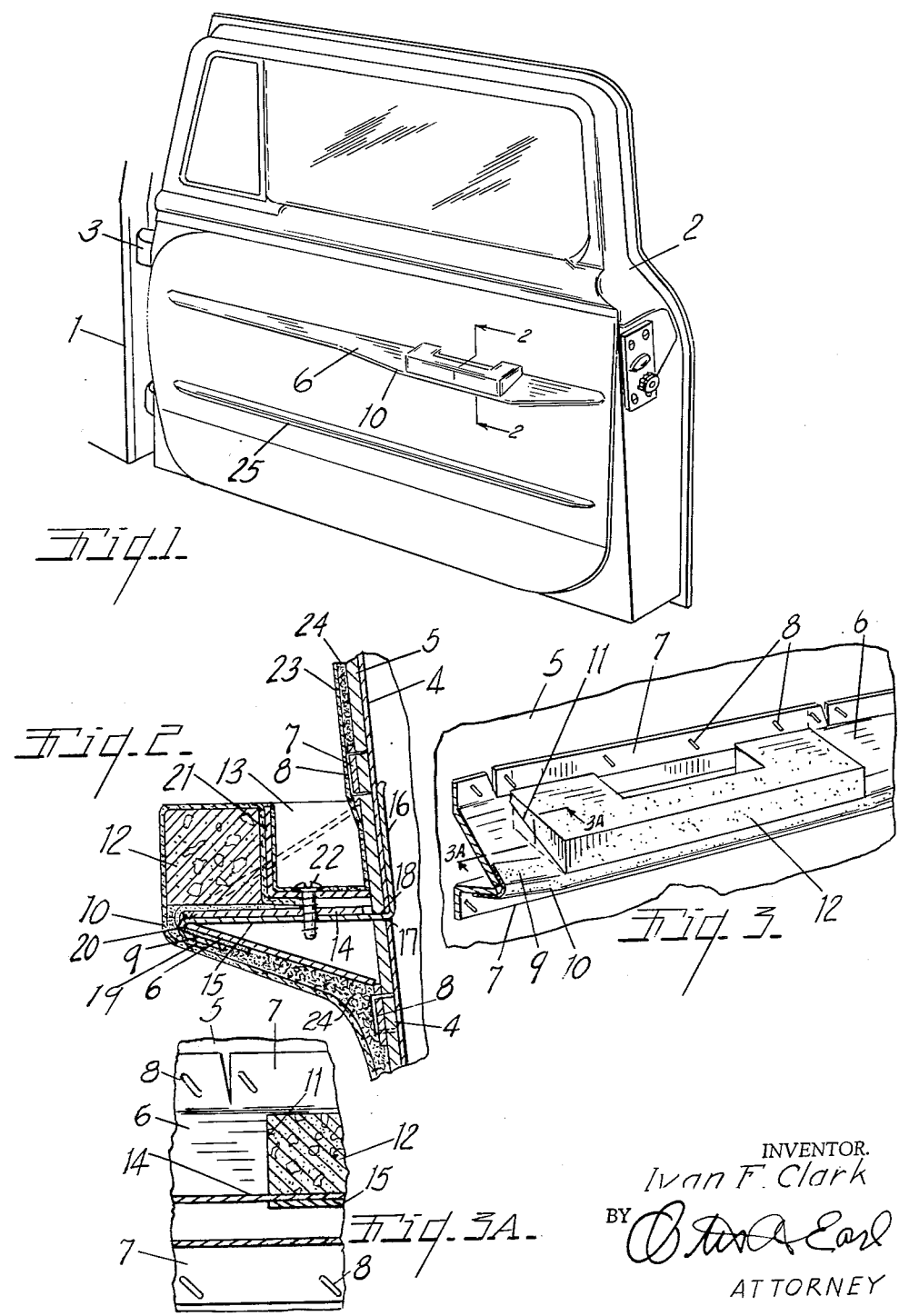
INVENTOR.
Ivan F. Clark
BY
ATTORNEY Jan. 2, 1962  I. F. CLARK  3,015,516
INNER PANEL WITH COMBINED ARMREST AND HANDHOLD FOR VEHICLE DOORS
Filed March 30, 1959  3 Sheets-Sheet 2
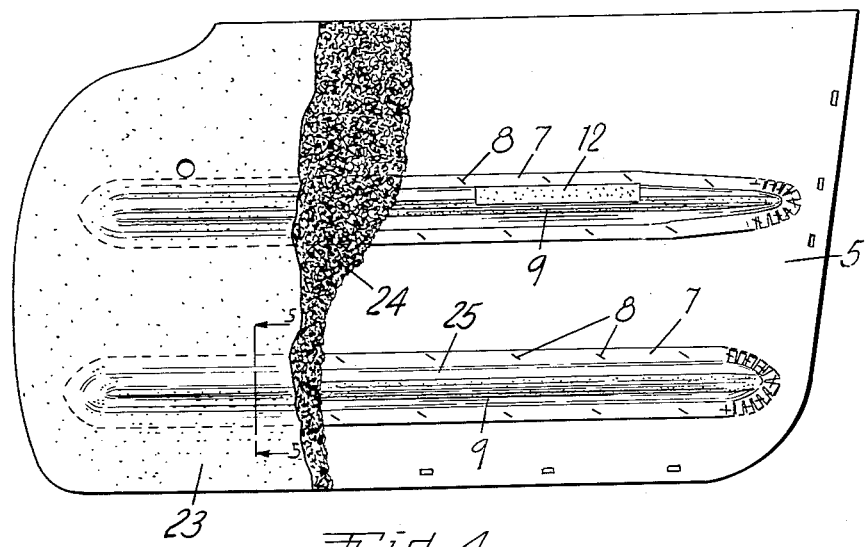
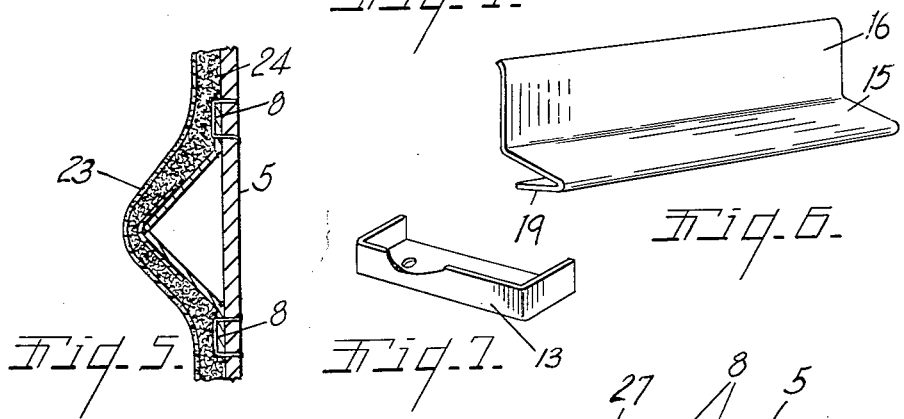
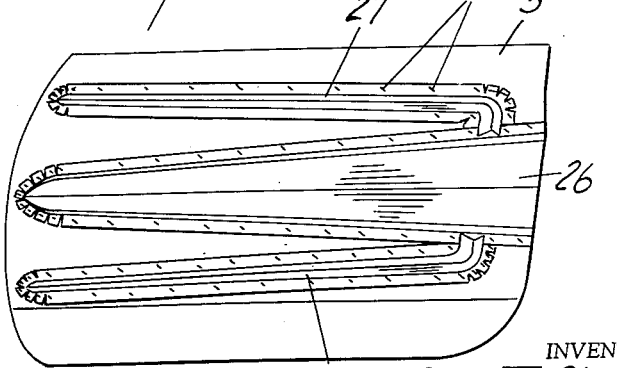
INVENTOR.
Ivan F. Clark
BY
ATTORNEY Jan. 2, 1962     I. F. CLARK     3,015,516
INNER PANEL WITH COMBINED ARMREST AND HANDHOLD FOR VEHICLE DOORS
Filed March 30, 1959     3 Sheets-Sheet 3
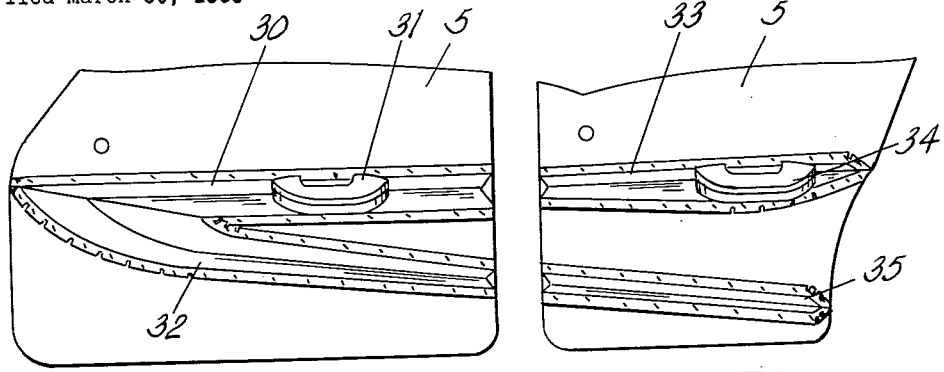
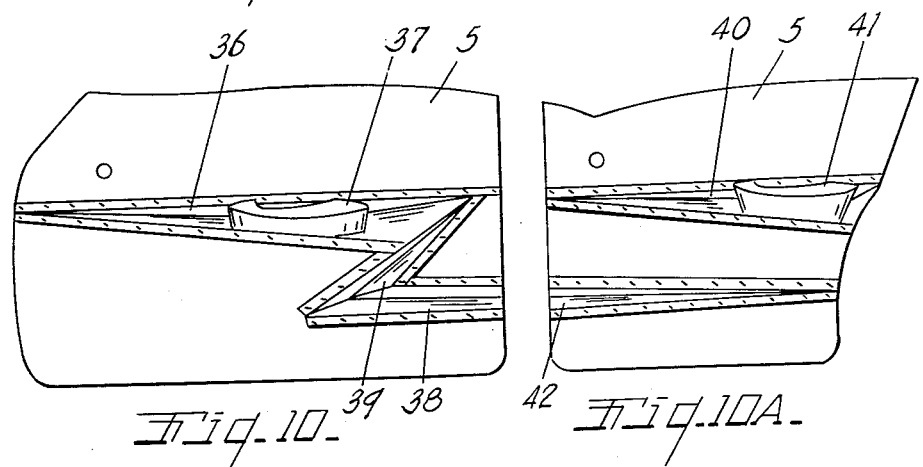
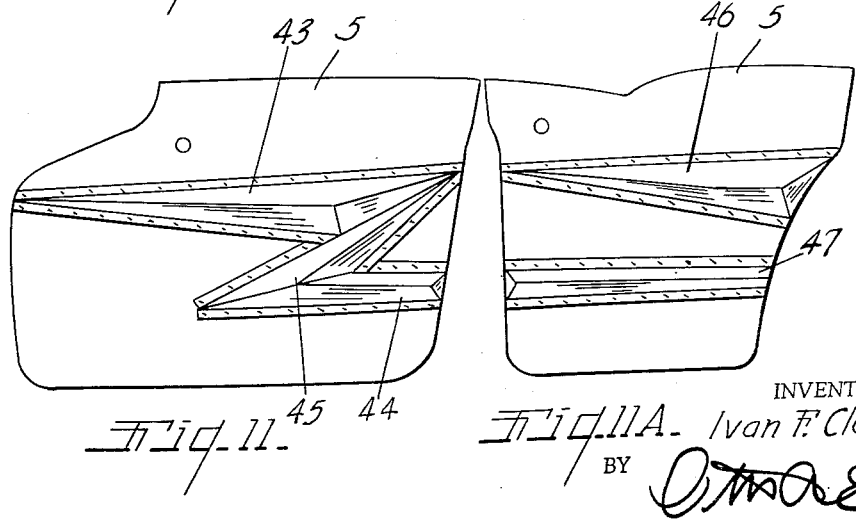
INVENTOR.
Ivan F. Clark
BY
ATTORNEY.

United States Patent Office 3,015,516
Patented Jan. 2, 1962

3,015,516
INNER PANEL WITH COMBINED ARMREST AND
HANDHOLD FOR VEHICLE DOORS
Ivan F. Clark, Lyons, Mich., assignor to Ivan Clark
Manufacturing Company, Lyons, Mich.
Filed Mar. 30, 1959, Ser. No. 802,827
10 Claims. (Cl. 296—44)

This invention relates to doors of the motor vehicle type and to inner panels therefor.

The main objects of this invention are:

First, to provide a vehicle door assembly including an inner upholstered panel unit having a combined arm rest and hand hold.

Second, to provide an inner panel for vehicle doors including an arm rest and hand hold which may be mainly formed of fiberboard and at the same time is strong and rigid.

Third, to provide an inner panel for vehicle doors having these advantages which may be very economically produced in varying sizes and shapes to meet the requirements for doors of varying sizes and proportions.

Objects relating to details and economies of the invention will appear from the description to follow. The invention is defined and pointed out in the claims.

A preferred embodiment of the invention is illustrated in the accompanying drawing, in which:

FIG. 1 is an inside perspective view of a mounted door embodying my invention.

FIG. 2 is an enlarged vertical section on a line corresponding to line 2—2 of FIG. 1 through the arm rest and hand hold portion of the structure.

FIG. 3 is a fragmentary perspective view prior to the application of the upholstery.

FIG. 3A is a fragmentary view in section on a line 3a—3a of FIG. 3.

FIG. 4 is an enlarged inside view with the upholstery partially removed or broken away.

FIG. 5 is an enlarged fragmentary view on a line corresponding to line 5—5 of FIG. 4.

FIG. 6 is a perspective view of the arm rest and hand hold supporting bracket.

FIG. 7 is a front perspective view partially broken away of the hand hold element.

FIG. 8 is an elevational view of a modified form of panel.

FIGS. 9, 9A, 10, 10A, 11 and 11A are elevational views of pairs of panels for front and rear doors of a motor vehicle, the structural differences of the panels illustrated in these figures being in the form and relationship of the rib like members or elements fixedly secured to the inner sides of the panels.

In the accompanying drawing 1 represents a body of a motor vehicle and 2 a door hinged thereto at 3. These parts are mainly conventionally shown. The details of the door structure other than the fact that it has an inner wall 4 are not illustrated. The inner wall 4 is adapted to receive the upholstered panel of my invention.

The inner panel 5 is desirably formed of a sheet of fiberboard or like material properly dimensioned to fit against the inner wall 4 of the door. It will be understood that these dimensions, so far as shape and size are concerned, vary greatly but the panel when formed of sheet fiberboard or the like may be readily shaped and dimensioned to meet requirements of a particular door installation.

The elongated combined arm rest and grip support designated generally by the numeral 6 is likewise formed of fiberboard or like stock and in this embodiment is of inwardly facing V-shaped channel section, its edges terminating in outturned flanges 7 which are fixedly secured to the panel 5, desirably by means of staples 8.

The member 6 is reinforced at its apex, which may be somewhat weakened or fractured by bending the stock from which it is formed, by the binding strip 9 which is adhesively bonded thereto. This member 6 has a relatively wide portion 10 adjacent the outer end thereof, that is, relative to the hinging of the door which is of such width as to constitute an arm rest and hand hold support. The outer edges of the member 6 are tapered in both directions from this portion 10.

The rib like member 6 serves as a reinforcing and stiffening member for the panel 5. The upper wall of the member 6 has transverse slits 11 spaced longitudinally thereof to provide an opening for the resilient cushioning member 12 and the hand hold member 13. The portion of the upper wall 14 between these slits is turned or depressed downwardly in overlapping relation to the bracket member 15, see FIGS. 2 and 6. This bracket member is provided with an upwardly projecting flange 16 on its rear edge which is adapted to be inserted through a slit 17 in the inner wall 4 of the door and through a registering slit 18 in the panel 5, see FIG. 2.

The front edge of the bracket is curved downwardly and rearwardly at 19 and embraces the front edge of the lower wall of the member 6, the rib member being disposed through a slit 20 therein, see FIG. 2. The hand hold 13 is disposed within the recess resulting from the slitting and turning downwardly of a portion of the upper wall of the support member and is fixedly secured to the bracket by means of screws 22. The front side and the ends of the hand hold are embraced by the resilient arm rest member 12. The panel with the parts mounted thereon is provided with the desired cover, that is, desired as to material and color and which is arranged over padding material 24 which may be of greater thickness below the member 6 than above, the thickness being increased below the member as that is the portion of the door which may be engaged or contacted by the legs of an operator.

The upholstered panel constitutes a unit which may be readily assembled as such on the inner wall of the door. It will be understood that these panels are usually applied to the point where the door is assembled as a completed door.

In the embodiment illustrated in FIG. 1 the panel 5 is provided with a second rib like member 25 which is arranged in parallel relation to the member 6. It is likewise formed of fiberboard and secured by means of flanges 7.

One of the advantages of my invention is that the design or appearance of the inner panel may be very materially changed without changing the functional relation of the parts.

In the modification shown in FIG. 8 the panel is provided with longitudinal rib members 26, 27 and 28. The hand hold and arm rest features or details are not illustrated in this figure but it will be understood that they are normally incorporated with or embodied in the upper rib member 27. They are not illustrated as the parts are not shown in such proportion as to make a clear illustration thereof practical.

In the embodiment shown in FIG. 9 the top member 30 is horizontally disposed and is conformed to provide an arm rest and hand hold 31. The lower rib member 32 is disposed at an angle to the member 31 and merges into one end thereof.

In FIG. 9A the rib member 33 is also provided with a combined hand hold and arm rest 34 and the rib 35 is arranged at an angle to the member 33.

These embodiments of FIGS. 9 and 9A are designed to be used on the front door and the other on the corresponding rear door of a motor vehicle. The same is true of FIGS. 10, 10A and FIGS. 11 and 11A.

In FIG. 10 the rib member 36 tapers rearwardly and is provided with a hand hold and arm rest member 37. The member 38 is tapered in the opposite direction and the members 36 and 37 are connected by the angularly disposed rib member 39.

In the embodiment of FIG. 10A the rib member 40 is tapered and provided with a hand hold and arm rest 41 while the rib member 42 is disposed in substantial parallel relation to the member 40 it is obviously tapered.

The embodiment shown in FIG. 11 is substantially that shown in FIG. 10, the hand hold and arm rest details not being illustrated in the embodiment of FIG. 11. The rib members 43, 44 and 45 are substantially the same.

In the embodiment shown in FIG. 11A the rib member 46 is shaped like the member 40 of FIG. 10A, the hand hold being omitted. The second rib member 47 of FIG. 11A is only slightly tapered.

These embodiments of FIGS. 8 to 11A inclusive are included to illustrate the wide range of adaptation of my invention. It is desired to point out, however, that what appears to be a matter merely of design does embody functional features in the matter of stiffening and reinforcing the inner panels.

The covering 23 and the padding material 24 are conventionally illustrated. However it should be noted that the covering extends over or embraces the cushioning member 12, see FIG. 2.

I have illustrated and described the several practical embodiments of my invention. I have not attempted to illustrate or describe other embodiments or adaptations as it is believed this disclosure will enable those skilled in the art to embody or adapt the invention as may be desired.

Having thus described the invention what is claimed as new and desired to secure by Letters Patent is:

1. A door structure of the class described comprising an inner wall, a panel of fiberboard or the like disposed on the inner side of said inner wall in supported relation thereto, a horizontally extending rib like member of fiberboard or the like and of inwardly facing channel section having laterally projecting flanges on its edges fixedly secured to said panel, said rib-like member having a relatively wide section adjacent one end thereof and tapering in width in both directions from said relatively wide section thereof, the upper wall of such relatively wide section having spaced transverse slits therein, the wall portion between said slits being deflected downwardly providing a hand hold opening, a supporting bracket on said inner wall projecting below said hand hold opening in said rib like member in supporting relation to said downwardly deflected wall portion thereof, an upwardly facing hand hold member arranged in said opening and said rib like member in supported relation to said bracket and secured thereto, a cushioning member arranged in said opening to embrace the front and ends of said hand hold member, and upholstery covering for said panel extending over said rib like member and said hand hold cushioning member and connected to said panel to constitute an assembled unit therewith.

2. A door structure of the class described comprising an inner wall, a panel of fiberboard or the like disposed on the inner side of said inner wall, a horizontally extending rib-like member of fiberboard or the like and of inwardly facing channel section having its edges fixedly secured to said panel, at least a portion of said rib like member being of such width as to constitute an arm rest and hand hold support and having longitudinally spaced transverse slits in the upper wall thereof providing a hand hold opening, the portion of the wall between said slits being deflected downwardly, a hand hold member disposed in said opening in said rib like member upon said downwardly deflected portion thereof, and a supporting bracket disposed on said inner wall in supporting relation to said hand hold member which is fixedly connected thereto.

3. A door structure of the class described comprising an inner wall, a panel of fiberboard or the like disposed on the inner side of said inner wall, a horizontally extending rib-like member of fiberboard or the like and of inwardly facing channel section having its edges fixedly secured to said panel, at least a portion of said rib like member being of such width as to constitute an arm rest and hand hold support and having longitudinally spaced transverse slits in the upper wall thereof providing a hand hold opening, a hand hold member disposed in said opening in said rib like member, and a supporting bracket disposed on said inner wall in supporting relation to said hand hold member which is fixedly connected thereto.

4. A door structure of the class described comprising an inner wall, a panel of fiberboard or the like disposed on the inner side of said inner wall, a horizontally extending rib-like member of fiberboard or the like and of inwardly facing channel section having its edges fixedly secured to said panel, at least a portion of said rib like member being of such width as to constitute an arm rest and hand hold support and having longitudinally spaced transverse slits in the upper wall thereof providing a hand hold opening, a hand hold member disposed in said opening in said rib like member, a supporting bracket disposed on said inner wall in supporting relation to said hand hold member which is fixedly connected thereto, a cushioning member arranged in said opening in said rib like member to embrace the front and ends of said hand hold member, and upholstery covering for said panel extending over said rib-like member and said cushioning member and connected to said panel to constitute an assembled unit therewith.

5. A door structure of the class described comprising an inner wall, a panel of fiberboard or the like disposed on the inner side of said inner wall, a rib-like member of fiberboard or the like and of inwardly facing channel section supportedly secured to said panel, at least a portion of said rib-like member being of such width as to constitute an arm rest and hand hold support and having an opening therein, a hand hold member disposed in said opening in said rib member, a cushioning member arranged in said opening in said rib like member to embrace the front ends of said hand hold member, and upholstery covering for said panel extending over said rib-like member and said cushioning member and connected to said panel to constitute an assembled unit therewith.

6. A door structure of the class described comprising an inner wall, a panel of fiberboard or the like disposed on the inner side of said inner wall, a rib-like member of fiberboard or the like and of inwardly facing channel section supportedly secured to said panel, at least a portion of said rib-like member being of such width as to constitute an arm rest and hand hold support and having an opening therein, and a hand hold member disposed in said opening in said rib like member.

7. A door structure of the class described comprising an inner wall, a panel of fiberboard or the like disposed on the inner side of said inner wall, a rib-like member of fiberboard or the like and of inwardly facing channel section having flanges on its edges supportedly secured to said panel, at least a portion of said rib-like member being of such width as to constitute an arm rest and hand hold support and having an opening therein, and a hand hold member disposed in said opening in said rib like member.

8. A panel unit adapted to be attached to the inner side of a door of a motor vehicle or the like comprising a sheet of fiberboard, a rib-like member of fiberboard or the like and of inwardly facing channel section fixedly secured to said panel, said member having a relatively wide section adjacent one end thereof and tapering in width in both directions from said relatively wide section thereof, the upper wall of such relatively wide section having spaced transverse slits therein, the wall portion between said slits being deflected downwardly providing a hand hold opening, a bracket adapted for supported connection to a door disposed below said handhold opening in said rib like member in supporting relation to said downwardly deflected wall portion thereof, and an upwardly facing hand hold member arranged in said opening in said rib like member in supported relation to said bracket and secured thereto.

9. A panel unit adapted to be attached to the inner side of the door of a motor vehicle or the like and comprising a sheet of fiberboard or the like, an elongated rib-like member of fiberboard or the like and of inwardly facing channel section fixedly secured to the panel, at least a portion of said rib like member being of such width as to constitute an arm rest and hand hold support and being recessed to receive a hand hold, a hand hold member disposed in said recess, a bracket adapted for supported connection to a door projecting into said rib-like member to be concealed thereby and disposed in supported relation to said hand hold member, a cushioning means disposed in said recess in said rib like member, and an upholstery covering for said panel extending over said rib like member and said cushioning member and retainingly connected to said panel to constitute an assembled unit.

10. A panel unit adapted to be attached to the inner side of the door of a motor vehicle or the like and comprising a sheet of fiberboard or the like, an elongated rib-like member of fiberboard or the like and of inwardly facing channel section fixedly secured to the panel, at least a portion of said rib like member being of such width as to constitute an arm rest and hand hold support and being recessed to receive a hand hold, a hand hold member disposed in said recess, and a bracket adapted for supported connection to a door projecting into said rib-like member to be concealed thereby and disposed in supported relation to said hand hold member.

References Cited in the file of this patent

UNITED STATES PATENTS

| | | |
|---|---|---|
| 1,979,131 | Woodall | Oct. 30, 1934 |
| 2,019,247 | Blum | Oct. 29, 1935 |
| 2,721,605 | Griffiths | Oct. 25, 1955 |
| 2,794,671 | Clark | June 4, 1957 |
| 2,897,000 | Hart | July 28, 1959 |

FOREIGN PATENTS

| | | |
|---|---|---|
| 782,485 | Great Britain | Sept. 4, 1957 |